(12) United States Patent
Miyazaki

(10) Patent No.: US 9,051,451 B2
(45) Date of Patent: Jun. 9, 2015

(54) RUBBER COMPOSITION FOR BREAKER TOPPING AND PNEUMATIC TIRE

(75) Inventor: Tatsuya Miyazaki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 13/469,146

(22) Filed: May 11, 2012

(65) Prior Publication Data

US 2012/0285599 A1 Nov. 15, 2012

(30) Foreign Application Priority Data

May 13, 2011 (JP) ................. 2011-108621

(51) Int. Cl.
| | |
|---|---|
| *C08K 5/44* | (2006.01) |
| *C08K 5/41* | (2006.01) |
| *C08K 3/38* | (2006.01) |
| *C08L 25/10* | (2006.01) |
| *C08L 9/00* | (2006.01) |
| C08K 3/36 | (2006.01) |
| C08K 5/098 | (2006.01) |
| C08K 5/47 | (2006.01) |

(52) U.S. Cl.
CPC .............. *C08K 5/41* (2013.01); *Y10T 152/1081* (2015.01); *C08K 5/44* (2013.01); *C08K 3/38* (2013.01); *Y02T 10/862* (2013.01); *B60C 2001/0066* (2013.04); *C08K 3/36* (2013.01); *C08K 5/098* (2013.01); *C08K 5/47* (2013.01)

(58) Field of Classification Search
CPC ........... C08L 25/10; C08L 21/00; C08L 7/00; C08L 9/00; B60C 2001/0075; B60C 2001/0066; C08K 3/38; C08K 5/44; C08K 5/41; C08K 5/47; C08K 3/36
USPC ........................................... 524/83; 152/537
See application file for complete search history.

(56) References Cited

U.S. PATENT DOCUMENTS

| | | | |
|---|---|---|---|
| 5,594,052 | A | 1/1997 | D'Sidocky et al. |
| 5,744,552 | A | 4/1998 | D'Sidocky et al. |
| 7,705,077 | B2 * | 4/2010 | Miyazaki .................. 524/394 |
| 8,258,213 | B2 * | 9/2012 | Miyazaki .................. 524/83 |
| 2002/0049294 | A1 | 4/2002 | Shiina |
| 2003/0105212 | A1 | 6/2003 | Lukich et al. |
| 2008/0009570 | A1 | 1/2008 | Miyazaki |

FOREIGN PATENT DOCUMENTS

| | | |
|---|---|---|
| CN | 1071937 A | 5/1993 |
| CN | 101314652 A | 12/2008 |
| CN | 101440176 A | 5/2009 |
| DE | 69608198 T2 | 12/2000 |
| JP | 3-7743 A | 1/1991 |
| JP | 7-102115 A | 4/1995 |
| JP | 2002-20550 A | 1/2002 |
| JP | 2002-97309 A | 4/2002 |
| JP | 2002-146102 A | 5/2002 |
| JP | 2003-213041 A | 7/2003 |
| JP | 2004-91505 A | 3/2004 |
| JP | 2007-63245 A | 3/2007 |
| JP | 2007-161819 A | 8/2007 |
| JP | 2007-277289 A | 10/2007 |
| JP | 2008-31427 A | 2/2008 |
| JP | 2008-208309 A | 9/2008 |
| JP | 4171434 B2 | 10/2008 |
| JP | 2008-308517 A | 12/2008 |
| JP | 2009-007549 A | 1/2009 |
| JP | 2009007549 A * | 1/2009 |
| JP | 2009051897 A * | 3/2009 |
| JP | 2009-155632 A | 7/2009 |
| JP | 2009-286872 A | 12/2009 |
| JP | 2010070745 A * | 4/2010 |
| JP | 2010090291 A * | 4/2010 |
| JP | 4588100 B1 | 11/2010 |

OTHER PUBLICATIONS

JP 2010070745 A (2010), machine translation, JPO Advanced Industrial Property Network (AIPN).*
JP 2010090291 A (2010), machine translation, JPO Advanced Industrial Property Network (AIPN).*
Rodgers et al., "Rubber Compounding- Processing Agents," Encyclopedia of Polymer Science and Technology, vol. 11, pp. 643-644 (2004).*
JP 2009-007549 A (2009), machine translation, JPO Advanced Industrial Property Network (AIPN).*
JP 2010-070745 A (2010), machine translation, JPO Advanced Industrial Property Network (AIPN).*
JP 2010-090291 A (2010), machine translation, JPO Advanced Industrial Property Network (AIPN).*
JP 2009-051897 A (2009), machine translation, JPO Advanced Industrial Property Network (AIPN).*
JP 2009-286872 A (2009), machine translation, JPO Advanced Industrial Property Network (AIPN).*

* cited by examiner

*Primary Examiner* — Susannah Chung
*Assistant Examiner* — Josephine Chang
(74) *Attorney, Agent, or Firm* — Birch, Stewart, Kolasch & Birch, LLP

(57) ABSTRACT

A rubber composition for a breaker topping can achieve balanced improvement of fuel economy, hardness, elongation at break, and adhesion. A pneumatic tire includes a breaker produced using the rubber composition. The rubber composition for a breaker topping includes a rubber component; silica; sulfur; a certain vulcanization accelerator; a compound represented by the following formula and/or a hydrate thereof; and stearic acid and/or cobalt stearate, wherein the mass ratio of the sulfur/the vulcanization accelerator and the total amount of stearic acid and cobalt stearate are set to the respective certain values, the formula being:

$$MO_3S-S-(CH_2)_q-S-SO_3M$$

wherein q represents an integer of 3 to 10, and Ms are the same as or different from each other, each representing lithium, potassium, sodium, magnesium, calcium, barium, zinc, nickel, or cobalt.

6 Claims, No Drawings

RUBBER COMPOSITION FOR BREAKER TOPPING AND PNEUMATIC TIRE

TECHNICAL FIELD

The present invention relates to a rubber composition for a breaker topping and a pneumatic tire using the same.

BACKGROUND ART

For rubber compositions used for a breaker as a tire component, balanced improvement of properties such as fuel economy, hardness, elongation at break, and adhesion to cords (e.g. steel cords) has been desired.

Known methods of improving these properties include methods employing various butadiene rubbers such as modified butadiene rubber and butadiene rubber containing 1,2-syndiotactic polybutadiene crystals, together with natural rubber.

However, completely mixing natural rubber and butadiene rubber during kneading is difficult, and therefore lumps of butadiene rubber may remain in the mixture. Butadiene rubber also has a possibility of exhibiting scorch during synthesis. A blend of natural rubber and butadiene rubber therefore has a problem that the blend has very low tensile strength compared to natural rubber, is likely to be easily peeled off the cords, and is far from having a fail-safe concept in terms of both kneadability and rubber scorch in synthesis.

Rubber compositions for a breaker also contain stearic acid in order to achieve high hardness through the crosslinking reaction of rubber. However, the adhesion of such rubber compositions has not been studied in detail, which means that the above balance of properties has not been considered enough.

Patent Document 1 teaches a composition containing a certain benzothiazolylsulfenimide and a compound such as a cobalt salt of an organic acid; still, the composition still leaves something to be desired in terms of improving the fuel economy, hardness, elongation at break, and adhesion in a balanced manner while satisfying the fail-safe concept.

Patent Document 1: JP 2009-7549 A

SUMMARY OF THE INVENTION

The present invention aims to provide a rubber composition for a breaker topping which enables to solve the above problems and improve the fuel economy, hardness, elongation at break, and adhesion in a balanced manner; and a pneumatic tire using the rubber composition.

The present invention relates to a rubber composition for a breaker topping, including: a rubber component; silica; sulfur; a compound represented by the following formula (1); a compound represented by the following formula (2) and/or a hydrate thereof; and stearic acid and/or cobalt stearate, wherein a mass ratio of [an amount of the sulfur]/[an amount of the compound represented by the following formula (1)] is 2.1 to 6.0, and a total amount of the stearic acid and cobalt stearate, calculated as stearic acid, is 0.5 to 1 part by mass for each 100 parts by mass of the rubber component, the formulas (1) and (2), respectively, being:

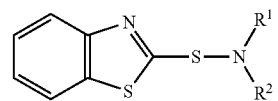

wherein $R^1$ represents a C2 to C16 alkyl group, and $R^2$ represents a C3 to C16 alkyl group, a benzothiazolylsulfide group, or a cycloalkyl group; and

wherein q represents an integer of 3 to 10, and Ms are the same as or different from each other, each representing lithium, potassium, sodium, magnesium, calcium, barium, zinc, nickel, or cobalt.

The rubber composition preferably contains a cobalt salt of an organic acid other than cobalt stearate. Meanwhile, it is preferable that an amount of the silica is 5 to 60 parts by mass, an amount of the sulfur is 4.5 to 6 parts by mass, a total amount of the compound represented by formula (2) and the hydrate thereof is 0.2 to 5 parts by mass, and a cobalt content is 0.05 to 0.15 parts by mass, for each 100 parts by mass of the rubber component.

It is preferable that an amount of an isoprene-based rubber is not less than 50% by mass and an amount of a modified styrene butadiene rubber is not more than 50% by mass, based on 100% by mass of the rubber component.

An amount of an isoprene-based rubber is preferably 100% by mass based on 100% by mass of the rubber component.

The rubber composition preferably further includes 0.5 to 4 parts by mass of at least one compound selected from the group consisting of resorcinol resins, modified resorcinol resins, cresol resins, and modified cresol resins for each 100 parts by mass of the rubber component.

The present invention also relates to a pneumatic tire including a breaker produced using the above rubber composition.

According to the present invention, the rubber composition for a breaker topping includes a rubber component; silica; sulfur; a compound represented by formula (1); a compound represented by formula (2) and/or a hydrate thereof; and stearic acid and/or cobalt stearate, and the mass ratio of [the amount of the sulfur]/[the amount of the compound represented by formula (1)] and the total amount of the stearic acid and cobalt stearate (calculated as stearic acid) are adjusted to the respective certain values. Hence, balanced improvement of fuel economy, hardness, elongation at break, and adhesion can be achieved.

BEST MODE FOR CARRYING OUT THE INVENTION

The rubber composition for a breaker topping according to the present invention contains a rubber component; silica; sulfur; a compound represented by formula (1); a compound represented by formula (2) and/or a hydrate thereof; and stearic acid and/or cobalt stearate, and has a mass ratio of the sulfur to the compound represented by formula (1) and a total amount of the stearic acid and cobalt stearate which are adjusted to the respective certain values.

The reason that the above effects can be provided in the present invention is not altogether clear, but is probably because of the following.

That is, stearic acid forms an intermediate with zinc oxide and a vulcanization accelerator to prevent sulfur adsorbed on the surface of zinc oxide from being released to the adhesive layer. This is why conventional compositions have insufficient adhesion due to lack of sulfur around the adhesive layer. In contrast, the composition of the present invention solves the problem of lack of sulfur around the adhesive layer and thus enables good bonding between polymer and brass plate because, with respect to the above compounding components, the mass ratio of the amount of the sulfur to the amount of the specific vulcanization accelerator represented by formula (1) and the total amount of the stearic acid and cobalt stearate are adjusted to the respective certain values. Therefore, good adhesion can be achieved, and also the fuel economy, hardness, and elongation at break can be improved in a balanced manner.

Further, the use of a large amount of an isoprene-based rubber in the rubber component, e.g. the use of an isoprene-based rubber alone, enables to greatly improve the above properties, and to avoid the risk of performance degradation due to the use of butadiene rubber, thereby satisfying the fail-safe concept.

Examples of rubbers which may be contained in the rubber component in the present invention include diene rubbers such as isoprene-based rubbers, butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). Among these, isoprene-based rubbers are preferred because they can greatly improve the balance of properties between fuel economy, hardness, elongation at break, and adhesion. Also, SBR may be used in combination with isoprene-based rubbers because a combination of SBR and an isoprene-based rubber does not cause phase separation and contributes to good reversion resistance, good fuel economy, and good hardness.

Examples of the isoprene-based rubbers include isoprene rubber (IR) and natural rubber (NR). Among these, NR is preferred for its contribution to the above balanced properties. NR may be, for example, a usually used one in the tire industry, such as SIR20, RSS#3, and TSR20.

The amount of isoprene-based rubber based on 100% by mass of the rubber component is preferably not less than 50% by mass, more preferably not less than 90% by mass, and still more preferably 100% by mass. If the amount is less than 50% by mass, sufficient elongation at break may not be achieved.

The SBR is not particularly limited, and suitable SBR may be one modified with a compound represented by the following formula (3) (modified SBR) as described in JP 2010-111753 A in terms of achieving excellent reversion resistance, excellent fuel economy, and excellent hardness.

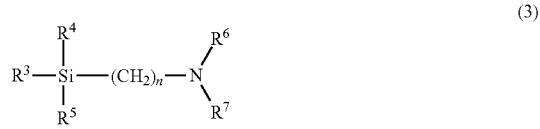

(3)

In the formula, $R^3$, $R^4$, and $R^5$ are the same as or different from each other, each representing an alkyl group, an alkoxy group (preferably a C1 to C8, more preferably C1 to C4 alkoxy group), a silyloxy group, an acetal group, a carboxy group (—COOH), a mercapto group (—SH), or a derivative thereof; $R^6$ and $R^7$ are the same as or different from each other, each representing a hydrogen atom or an alkyl group (preferably a C1 to C4 alkyl group); and n represents an integer (preferably an integer of 1 to 5, more preferably 3).

$R^3$, $R^4$, and $R^5$ are each preferably an alkoxy group, and $R^6$ and $R^7$ are each preferably a hydrogen atom. In such a case, excellent fuel economy and excellent hardness can be achieved.

Specific examples of the compound represented by formula (3) include 3-aminopropyltrimethoxysilane, 3-aminopropyltriethoxysilane, 3-aminopropyldimethylmethoxysilane, 3-aminopropylmethyldimethoxysilane, 2-dimethylaminoethyltrimethoxysilane, 3-diethylaminopropyltrimethoxysilane, and 3-dimethylaminopropyltrimethoxysilane.

The method of modifying styrene butadiene rubber with the compound (modifier) represented by formula (3) may be a conventionally used method such as ones described in JP H6-53768 B, JP H6-57767 B, and JP 2003-514078 T. For example, the method may involve bringing styrene butadiene rubber in contact with the modifier; specifically, mention is made of a method involving preparing styrene butadiene rubber by anionic polymerization, adding a certain amount of the modifier to the resulting rubber solution, and reacting the polymerizing end (active end) of the styrene butadiene rubber and the modifier.

The lower limit of the amount of SBR based on 100% by mass of the rubber component is not particularly limited, but is preferably not less than 10% by mass, while the upper limit thereof is preferably not more than 50% by mass, and more preferably not more than 30% by mass.

In the case that an isoprene-based rubber and SBR are contained, the total amount of isoprene-based rubber and SBR based on 100% by mass of the rubber component is preferably 100% by mass. Such an amount enables to achieve good fuel economy and good hardness, and also to satisfy the fail-safe concept.

The silica is not particularly limited, and examples thereof include dry silica (silicic anhydride) and wet silica (hydrous silicic acid). Wet silica is preferred because it has more silanol groups.

The nitrogen adsorption specific surface area ($N_2SA$) of silica is preferably not less than 100 m$^2$/g, and more preferably not less than 160 m$^2$/g. If the $N_2SA$ is less than 100 m$^2$/g, the elongation at break tends to decrease. The $N_2SA$ is preferably not more than 220 m$^2$/g, and more preferably not more than 180 m$^2$/g. If the $N_2SA$ is more than 220 m$^2$/g, the fuel economy and processability tend to decrease.

The nitrogen adsorption specific surface area of silica herein is a value determined by the BET method in accordance with ASTM D 3037-81.

The amount of silica is preferably not less than 5 parts by mass, and more preferably not less than 8 parts by mass for each 100 parts by mass of the rubber component. If the amount is less than 5 parts by mass, sufficient adhesion (particularly after hygrothermal aging) may not be achieved. The amount is preferably not more than 60 parts by mass, and more preferably not more than 15 parts by mass for each 100 parts by mass of the rubber component. If the amount is more than 60 parts by mass, the hardness and fuel economy may decrease.

The rubber composition of the present invention preferably contains a silane coupling agent together with silica. Examples of the silane coupling agent include sulfide silane coupling agents, mercapto silane coupling agents, vinyl silane coupling agents, amino silane coupling agents, glycidoxy silane coupling agents, nitro silane coupling agents, and chloro silane coupling agents. Among these, sulfide silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide are preferred, and bis(3-triethoxysilylpropyl)disulfide and bis (3-triethoxysilylpropyl)tetrasulfide are more preferred.

The amount of silane coupling agent is preferably not less than 1 part by mass, and more preferably not less than 8 parts by mass for each 100 parts by mass of silica. If the amount is less than 1 part by mass, the elongation at break tends to decrease. The amount is preferably not more than 15 parts by mass, and more preferably not more than 12 parts by mass for each 100 parts by mass of silica. If the amount is more than 15 parts by mass, the effects that should be achieved by the addition of a silane coupling agent, such as an increase in the elongation at break and a decrease in the rolling resistance, tend not to be achieved.

The rubber composition of the present invention preferably contains carbon black. Thereby, good reinforcement is achieved, and properties such as excellent hardness, excellent elongation at break, and excellent ultraviolet degradation resistance can be achieved.

The nitrogen adsorption specific surface area ($N_2SA$) of carbon black is preferably not less than 40 $m^2/g$, and more preferably not less than 70 $m^2/g$. If the $N_2SA$ is less than 40 $m^2/g$, sufficient elongation at break may not be achieved. The $N_2SA$ is preferably not more than 200 $m^2/g$, and more preferably not more than 90 $m^2/g$. If the $N_2SA$ is more than 200 $m^2/g$, sufficient fuel economy may not be achieved.

The $N_2SA$ of carbon black is determined in accordance with JIS K 6217-2:2001.

The amount of carbon black for each 100 parts by mass of the rubber component is preferably not less than 5 parts by mass, and more preferably not less than 30 parts by mass, but preferably not more than 50 parts by mass, and more preferably not more than 40 parts by mass. If the amount is in the above range, the above properties can be favorably achieved.

In the case of adding carbon black, the content of carbon black based on 100% by mass of a total of silica and carbon black is preferably not less than 25% by mass, more preferably not less than 60% by mass, and still more preferably not less than 70% by mass. The content thereof is preferably not more than 95% by mass, and more preferably not more than 90% by mass. If the content is in the above range, the above balance of properties tends to be good.

Examples of the sulfur used include powdered sulfur, precipitated sulfur, colloidal sulfur, insoluble sulfur, and highly dispersible sulfur.

The amount of the sulfur is preferably not less than 4.5 parts by mass, and more preferably not less than 5.0 parts by mass for each 100 parts by mass of the rubber component. If the amount is less than 4.5 parts by mass, the hardness and adhesion may decrease. The amount is preferably not more than 6 parts by mass, and more preferably not more than 5.6 parts by mass for each 100 parts by mass of the rubber component. If the amount is more than 6 parts by mass, a sheet of a topping formed by processing the resulting composition may allow sulfur to bloom to the surface thereof, so that the adhesion processability tends to greatly decrease. The elongation at break after hygrothermal aging and the fuel economy tend to decrease.

The rubber composition of the present invention contains a compound represented by the following formula (1):

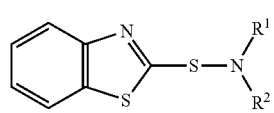

(1)

wherein $R^1$ represents a C2 to C16 alkyl group, and $R^2$ represents a C3 to C16 alkyl group, a benzothiazolylsulfide group, or a cycloalkyl group.

The alkyl group for $R^1$ preferably has a branched structure in terms of favorably achieving the effects of the present invention. The alkyl group having a branched structure is preferably an alkyl group having a branched structure in which at least one hydrogen atom contained in the carbon chain $(CH_2)_k$ of a straight-chain alkyl group represented by —$(CH_2)_k$—$CH_3$ (k is an integer of 1 to 14) is substituted by an alkyl group (i.e. a straight-chain alkyl group containing a branch).

The carbon number of the alkyl group for $R^1$ is preferably 3 to 16, more preferably 4 to 16, and still more preferably 6 to 12. If the carbon number is 1, the compound tends to be adsorbed. If the carbon number is not less than 17, the hardness tends to decrease.

Examples of preferred alkyl groups for $R^1$ include ethyl, t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl.

The alkyl group for $R^2$ preferably has a branched structure in terms of favorably achieving the effects of the present invention. The alkyl group having a branched structure is preferably one as described above for $R^1$.

The carbon number of the alkyl group for $R^2$ is preferably 4 to 16, and more preferably 6 to 12. If the carbon number is not more than 2, the compound tends to be adsorbed. If the carbon number is not less than 17, the hardness tends to decrease.

Examples of preferred alkyl groups for $R^2$ include t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl.

The benzothiazolylsulfide group for $R^2$ is a group represented by the following formula.

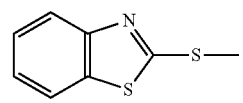

The carbon number of the cycloalkyl group for $R^2$ is preferably 3 to 16. Examples of preferred cycloalkyl groups for $R^2$ include cyclohexyl.

In the case that $R^1$ is a t-butyl group, $R^2$ is preferably a benzothiazolylsulfide group for excellent hardness.

Examples of the compound represented by formula (1) include BEHZ (N,N-di(2-ethylhexyl)-2-benzothiazolylsulfenamide) produced by Kawaguchi Chemical Industry Co., Ltd., BMHZ (N,N-di(2-methylhexyl)-2-benzothiazolylsulfenamide) produced by Kawaguchi Chemical Industry Co., Ltd., SANTOCURE TBSI (N-tert-butyl-2-benzothiazolylsulfenimide) produced by FLEXSYS, and ETZ (N-ethyl-N-t-butylbenzothiazole-2-sulfenamide) produced by Ouchi Shinko Chemical Industrial Co., Ltd.

The amount of the compound represented by formula (1) is preferably not less than 0.75 parts by mass, and more preferably not less than 1.1 parts by mass for each 100 parts by mass of the rubber component. If the amount is less than 0.75 parts by mass, the hardness may decrease. The amount is preferably not more than 2.86 parts by mass, and more preferably not more than 1.9 parts by mass for each 100 parts by mass of the rubber component. If the amount is more than 2.86 parts by mass, the adhesion (particularly after hygrothermal aging) tends to decrease.

The rubber composition of the present invention satisfies the relation that [the amount of the sulfur]/[the amount of the compound represented by formula (1)] (mass ratio) is 2.1 to 6.0. In terms of achieving good fuel economy, good hardness, good elongation at break, and good adhesion, the rubber composition preferably satisfies the relation that the mass ratio is 2.2 to 6.0, and more preferably 2.5 to 4.5.

The rubber composition of the present invention contains a compound represented by the following formula (2) and/or a hydrate thereof:

  (2)

wherein q represents an integer of 3 to 10, and Ms are the same as or different from each other, each representing lithium, potassium, sodium, magnesium, calcium, barium, zinc, nickel, or cobalt.

In formula (2), q is an integer of 3 to 10, preferably 3 to 6. If q is less than 3, the elongation at break may not be sufficiently improved. If q is more than 10, the properties such as elongation at break tend not to be improved to an extent that is proportionate to the increased molecular weight.

In formula (2), M is lithium, potassium, sodium, magnesium, calcium, barium, zinc, nickel, or cobalt, and is preferably potassium or sodium. Examples of a hydrate of the compound represented by formula (2) include sodium salt monohydrates and sodium salt dihydrates.

With respect to the compound represented by formula (2) and a hydrate thereof, derivatives of sodium thiosulfate, e.g., sodium 1,6-hexamethylene dithiosulfate dihydrate are preferred.

The total amount of the compound represented by formula (2) and a hydrate thereof is preferably not less than 0.2 parts by mass, and more preferably not less than 0.35 parts by mass for each 100 parts by mass of the rubber component. If the total amount is less than 0.2 parts by mass, the adhesion (particularly after hygrothermal aging) may decrease. The total amount is preferably not more than 5 parts by mass, and more preferably not more than 1 part by mass for each 100 parts by mass of the rubber component. If the total amount is more than 5 parts by mass, the improvement effects which should be proportionate to the increased amount tend not to be achieved.

In contrast to the compound represented by formula (2) and a hydrate thereof used in the present invention, use of 1,3-bis(citraconimidomethyl)benzene, 1,6-bis(N,N'-dibenzylthiocarbamoyldithio)hexane, or an alkylphenol-sulfur chloride condensate tends to result in insufficient improvement of the adhesion after hygrothermal aging.

In the present invention, stearic acid and/or cobalt stearate are used in a certain amount calculated as stearic acid (in the case of cobalt stearate, the stearic acid equivalent amount calculated from the amount of cobalt stearate) is used.

The total amount of stearic acid and cobalt stearate, calculated as stearic acid, is not less than 0.5 parts by mass, and preferably not less than 0.6 parts by mass for each 100 parts by mass of the rubber component. If the total amount is less than 0.5 parts by mass, the hardness and fuel economy may decrease. The total amount is not more than 1 part by mass, and preferably not more than 0.8 parts by mass for each 100 parts by mass of the rubber component. If the amount is more than 1 part by mass, the adhesion (particularly after hygrothermal aging) tends to decrease.

The rubber composition of the present invention may contain cobalt stearate as above, and may also contain other cobalt salts of organic acids. Thereby, the adhesion between the cords and the rubber can be improved. Examples of the cobalt salts of organic acids include cobalt naphthenate, cobalt neodecanoate, and cobalt salts of organic acids which contain boron (e.g. cobalt boron 3 neodecanoate). Among these, cobalt salts of organic acids which contain boron are preferred for excellent adhesion.

The cobalt content (the total amount of cobalt derived from cobalt stearate and other components such as other cobalt salts of organic acids) in the rubber composition of the present invention is preferably not less than 0.05 parts by mass, and more preferably not less than 0.1 parts by mass for each 100 parts by mass of the rubber component. If the content is less than 0.05 parts by mass, the adhesion (particularly after hygrothermal aging) tends to decrease. The content is preferably not more than 0.15 parts by mass, and more preferably not more than 0.12 parts by mass for each 100 parts by mass of the rubber component. If the content is more than 0.15 parts by mass, the elongation at break (particularly after hygrothermal aging) tends to decrease.

The rubber composition of the present invention preferably contains at least one compound selected from the group consisting of resorcinol resins, modified resorcinol resins, cresol resins, and modified cresol resins. The use of such a compound enables to achieve the hardness, elongation at break, and adhesion at high levels. Among these, resorcinol resins and modified resorcinol resins are more preferred because they can contribute to good fuel economy and good adhesion.

Examples of the resorcinol resins include resorcinol-formaldehyde condensates. Specific examples thereof include Resorcinol produced by Sumitomo Chemical Co., Ltd. Examples of the modified resorcinol resins include resorcinol resins of which part of repeating units are alkylated. Specific examples thereof include Penacolite resins B-18-S and B-20 produced by INDSPEC Chemical Corporation, Sumikanol 620 produced by Taoka Chemical Co., Ltd., R-6 produced by Uniroyal Chemical, SRF 1501 produced by Schenectady Chemicals, and Arofene 7209 produced by the Ashland Inc.

The total amount of resorcinol resins, modified resorcinol resins, cresol resins, and modified cresol resins is preferably not less than 0.5 parts by mass, and more preferably not less than 1 part by mass for each 100 parts by mass of the rubber component. If the total amount is less than 0.5 parts by mass, the hardness and adhesion (particularly after hygrothermal aging) may decrease. The total amount is preferably not more than 4 parts by mass, and more preferably not more than 2 parts by mass for each 100 parts by mass of the rubber component. If the total amount is more than 4 parts by mass, the elongation at break (particularly after hygrothermal aging) tends to decrease.

The rubber composition of the present invention preferably contains a partial condensate of hexamethoxymethylol melamine (HMMM) and/or a partial condensate of hexamethylol melamine pentamethyl ether (HMMPME). The use of such a compound enables to increase the adhesion of the adhesive rubber layer to the cords. In particular, partial condensates of HMMPME are preferred for excellent adhesion.

In terms of good adhesion and good fuel economy, the total amount of the partial condensate of HMMM and the partial condensate of HMMPME is preferably not less than 0.7 parts by mass, and more preferably not less than 1 part by mass, but is preferably not more than 2 parts by mass, and more preferably not more than 1.5 parts by mass, for each 100 parts by mass of the rubber component.

Note that the use of hexamethylenetetramine (HMT) does not give sufficient adhesion to the cords, leading to a decrease in the durability.

The rubber composition of the present invention may appropriately contain additives usually used in production of rubber compositions other than the above ingredients, such as various antioxidants and zinc oxide.

The rubber composition of the present invention may be produced by a known method such as a method involving kneading the above ingredients with a rubber kneading apparatus such as an open roll mill and a Banbury mixer, and then vulcanizing the kneaded mixture.

The rubber composition for a breaker topping according to the present invention is used for a breaker which is arranged inside the tread and on the radially outer side of the carcass; specific examples thereof include breakers as illustrated in FIG. 1 of JP 2004-67027 A.

The pneumatic tire of the present invention can be produced by coating tire cords with the rubber composition for a breaker topping, molding the coated cords into the shape of a breaker, assembling this component with other tire components to form an unvulcanized tire, and vulcanizing the unvulcanized tire.

EXAMPLES

Hereinafter, the present invention will be described in more detail based on examples which, however, are not intended to limit the scope of the present invention.

The various chemicals used in the examples and comparative examples are listed below.

NR: TSR20

Modified SBR: HPR 340 (modified S-SBR, bound styrene content: 10% by mass, Tg: −64° C., terminally modified with an alkoxysilane by coupling, modified with a compound represented by formula (3) ($R^3$ to $R^5$=methoxy groups, $R^6$ and $R^7$=hydrogen atoms, n=3)) produced by JSR Corp.

Silica: ULTRASIL VN3 ($N_2$SA: 175 $m^2$/g) produced by Degussa

Carbon black: DIABLACK N326 ($N_2$SA: 84 $m^2$/g, DBP oil absorption: 74 $cm^3$/100 g) produced by Mitsubishi Chemical Corporation Cobalt boron neodecanoate: Dicnate NBC-II (cobalt boron 3 neodecanoate, cobalt content: 22.0% by mass) produced by Dainippon Ink and Chemicals Cobalt neodecanoate: cobalt neodecanoate (cobalt content: 14.0% by mass) produced by Dainippon Ink and Chemicals Cobalt stearate: cost-F (cobalt content: 9.5% by mass, stearic acid content: 90.5% by mass) produced by Dainippon Ink and Chemicals Silane coupling agent: Si69 (bis(3-triethoxysilylpropyl) tetrasulfide) produced by Degussa Hybrid crosslinking agent: DURALINK HTS (sodium 1,6-hexamethylene dithiosulfate dihydrate) produced by FLEXSYS V200: Tackirol V200 (alkylphenol-sulfur chloride condensate) produced by Taoka Chemical Co., Ltd.

Antioxidant: FLECTOL TMQ produced by FLEXSYS

Stearic acid: Tsubaki produced by NOF Corporation

Zinc oxide: zinc oxide #2 produced by Mitsui Mining & Smelting Co., Ltd.

20% oil-containing insoluble sulfur: CRYSTEX HS OT20 (insoluble sulfur containing 80% by mass of sulfur and 20% by mass of oil) produced by FLEXSYS Vulcanization accelerator (TBSI): SANTOCURE TBSI (N-tert-butyl-2-benzothiazolylsulfenimide, following formula) produced by FLEXSYS

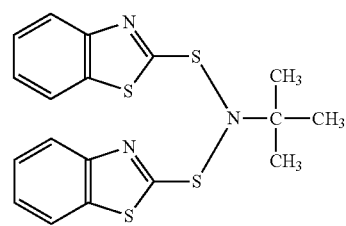 [SMILES: CC(C)(C)N(Sc1nc2ccccc2s1)Sc1nc2ccccc2s1]

Vulcanization accelerator (BEHZ): BEHZ (N,N-di(2-ethylhexyl)-2-benzothiazolylsulfenamide, following formula) produced by Kawaguchi Chemical Industry Co., Ltd.

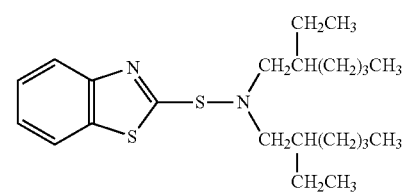

Vulcanization accelerator (ETZ): ETZ (N-ethyl-N-t-butyl-benzothiazole-2-sulfenamide, following formula) produced by Ouchi Shinko Chemical Industrial Co., Ltd.

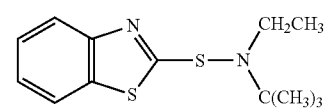

Sumikanol 620: Sumikanol 620 (modified resorcinol resin (modified resorcinol-formaldehyde condensate)) produced by Taoka Chemical Co., Ltd.

Sumikanol 507A: Sumikanol 507A (modified etherified methylol melamine resin (partial condensate of hexamethylol melamine pentamethyl ether (HMMPME)), silica and oil content: 35% by mass) produced by Sumitomo Chemical Co., Ltd.

The materials in amounts shown in Tables 1 to 4, except the sulfur, vulcanization accelerator, hybrid crosslinking agent, and Sumikanol 507A, were kneaded in a 1.7-L Banbury mixer. The obtained kneaded mixture was mixed and kneaded with the sulfur, vulcanization accelerator, hybrid crosslinking agent, and Sumikanol 507A by a roll, so that an unvulcanized rubber composition was obtained. The obtained unvulcanized rubber composition was press-vulcanized at 170° C. for 12 minutes, whereby a vulcanized rubber composition was obtained.

The obtained vulcanized rubber composition was subjected to hygrothermal aging under the conditions of a temperature of 80° C. and a humidity of 95% for 150 hours, so that a hygrothermally aged material was obtained.

The vulcanized rubber compositions (new ones and hygrothermally aged ones) were evaluated by the following tests. Tables 1 to 4 show the results.

(Viscoelasticity Test)

The complex elastic modulus E* (MPa) and loss tangent, tan δ, were measured on the vulcanized rubber compositions (new ones) using a viscoelasticity spectrometer VES (produced by Iwamoto Seisakusho Co., Ltd.) under the following conditions: a temperature of 70° C.; a frequency of 10 Hz; an initial strain of 10%; and a dynamic strain of 2%. A larger E* corresponds to higher rigidity and better hardness (handling stability). A smaller tan δ value corresponds to less heat build-up and better fuel economy. The compositions are considered to have no practical problems if the E* is not smaller than 4.5 and the tan δ is not more than 0.11.

(Tensile Test)

Using No. 3 dumbbell-shaped test pieces made of the vulcanized rubber compositions (new ones and hygrothermally aged ones), a tensile test was carried out at room temperature in accordance with JIS K 6251 ("Rubber, vulcanized or thermoplastic—Determination of tensile stress-strain properties"), and the elongation at break EB (%) was measured. A higher EB value indicates better elongation at break. The compositions are considered to have no practical problems if the EB is not less than 300 in the case of new ones, and not less than 200 in the case of aged ones.

(Adhesion Test (Point Rating of Rubber Residue after Peeling))

An adhesion test was performed using peeling test samples of the vulcanized rubber compositions (new ones and hygrothermally aged ones). In the test, the rubber coating ratio after peeling (the proportion of the area still coated with the rubber composition to the peeled surface after peeling between the rubber composition and the steel cords) was measured. The rubber coating ratio was evaluated on a five-point scale. A higher point indicates better adhesion to the steel cords, with the point "5" indicating that the surface was fully coated, and the point "0" indicating that the surface was not coated at all. The compositions are considered to have no practical problems if the point is not less than 3 in the case of new ones, and not less than 200 in the case of aged ones.

TABLE 1

|  |  | Example | | | | | |
|---|---|---|---|---|---|---|---|
|  |  | 1 | 2 | 3 | 4 | 5 | 6 |
| Composition (part(s) by mass) | NR (TSR20) | 100 | 100 | 100 | 70 | 50 | 100 |
|  | Modified SBR (HPR340) | — | — | — | 30 | 50 | — |
|  | Silica (VN3) | 10 | 5 | 30 | 10 | 10 | 10 |
|  | Carbon black (N326) | 40 | 45 | 10 | 40 | 40 | 40 |
|  | Cobalt boron neodecanoate | 0.44 | 0.44 | 0.44 | 0.44 | 0.44 | — |
|  | Cobalt neodecanoate | — | — | — | — | — | — |
|  | Cobalt stearate | — | — | — | — | — | 1 |
|  | (stearic acid equivalent amount) | (—) | (—) | (—) | (—) | (—) | (0.905) |
|  | Silane coupling agent (Si69) | 1 | 0.05 | 3 | 1 | 1 | 1 |
|  | Hybrid crosslinking agent (HTS) | 0.5 | 0.5 | 0.5 | 0.5 | 0.5 | 0.5 |
|  | V200 | — | — | — | — | — | — |
|  | Antioxidant (TMQ) | 1 | 1 | 1 | 1 | 1 | 1 |
|  | Stearic acid | 0.7 | 0.7 | 0.7 | 0.7 | 0.7 | — |
|  | Zinc oxide | 10 | 10 | 10 | 10 | 10 | 10 |
|  | 20% oil-containing insoluble sulfur | 5.63 | 6.25 | 6.25 | 6.25 | 6.25 | 6.25 |
|  | (pure sulfur content) | (4.5) | (5) | (5) | (5) | (5) | (5) |
|  | Vulcanization accelerator (TBSI) | 1.5 | 1.3 | 1.3 | 1.3 | 1.3 | 1.3 |
|  | Vulcanization accelerator (BEHZ) | — | — | — | — | — | — |
|  | Smikanol 620 | 1.5 | 1.5 | 1.5 | 1.5 | 1.5 | 1.5 |
|  | Smikanol 507A | 1.8 | 1.8 | 1.8 | 1.8 | 1.8 | 1.8 |
|  | Mass ratio of sulfur/vulcanization accelerator | 3.00 | 3.85 | 3.85 | 3.85 | 3.85 | 3.85 |
| Evaluation | E* (70° C.) | 6.3 | 6.5 | 5.2 | 6.5 | 7.4 | 6.7 |
|  | tan δ (70° C.) | 0.069 | 0.073 | 0.071 | 0.083 | 0.095 | 0.065 |
|  | Elongation at break (new one) | 440 | 455 | 540 | 410 | 355 | 445 |
|  | Elongation at break (hygrothermally aged one) | 325 | 350 | 410 | 305 | 260 | 310 |
|  | Cord adhesion (new one) | 4 | 5 | 5 | 5 | 5 | 4+ |
|  | Cord adhesion (hygrothermally aged one) | 3 | 4 | 4.5 | 4 | 4 | 3 |

|  |  | Example | | | | Comparative Example | |
|---|---|---|---|---|---|---|---|
|  |  | 7 | 8 | 9 | 10 | 1 | 2 |
| Composition (part(s) by mass) | NR (TSR20) | 100 | 100 | 100 | 100 | 100 | 100 |
|  | Modified SBR (HPR340) | — | — | — | — | — | — |
|  | Silica (VN3) | 10 | 10 | 10 | 10 | — | 10 |
|  | Carbon black (N326) | 40 | 40 | 40 | 40 | 45 | 40 |
|  | Cobalt boron neodecanoate | — | 0.68 | 0.44 | 0.44 | 0.44 | 0.44 |
|  | Cobalt neodecanoate | 0.71 | — | — | — | — | — |
|  | Cobalt stearate | — | — | — | — | — | — |
|  | (stearic acid equivalent amount) | (—) | (—) | (—) | (—) | (—) | (—) |
|  | Silane coupling agent (Si69) | 1 | 1 | 1 | 1 | — | 1 |
|  | Hybrid crosslinking agent (HTS) | 0.5 | 0.5 | 0.5 | 2 | 0.5 | — |
|  | V200 | — | — | — | — | — | 0.5 |
|  | Antioxidant (TMQ) | 1 | 1 | 1 | 1 | 1 | 1 |
|  | Stearic acid | 0.7 | 0.7 | 0.7 | 0.7 | 0.7 | 0.7 |
|  | Zinc oxide | 10 | 10 | 10 | 10 | 10 | 10 |
|  | 20% oil-containing insoluble sulfur | 6.25 | 6.25 | 6.25 | 6.25 | 6.25 | 6.25 |
|  | (pure sulfur content) | (5) | (5) | (5) | (5) | (5) | (5) |
|  | Vulcanization accelerator (TBSI) | 1.3 | 1.3 | — | 1.3 | 1.3 | 1.3 |
|  | Vulcanization accelerator (BEHZ) | — | — | 1.9 | — | — | — |
|  | Smikanol 620 | 1.5 | 1.5 | 1.5 | 1.5 | 1.5 | 1.5 |
|  | Smikanol 507A | 1.8 | 1.8 | 1.8 | 1.8 | 1.8 | 1.8 |

TABLE 1-continued

|  |  | | | | | | |
|---|---|---|---|---|---|---|---|
|  | Mass ratio of sulfur/vulcanization accelerator | 3.85 | 3.85 | 2.63 | 3.85 | 3.85 | 3.85 |
| Evaluation | E* (70° C.) | 6.2 | 7.2 | 6.1 | 6.3 | 6.7 | 6.6 |
|  | tan δ (70° C.) | 0.073 | 0.067 | 0.069 | 0.07 | 0.079 | 0.061 |
|  | Elongation at break (new one) | 460 | 440 | 555 | 455 | 390 | 375 |
|  | Elongation at break (hygrothermally aged one) | 350 | 315 | 410 | 345 | 285 | 225 |
|  | Cord adhesion (new one) | 5 | 5 | 5 | 5 | 4 | 3 |
|  | Cord adhesion (hygrothermally aged one) | 4 | 4 | 4+ | 4+ | 3 | 1 |

TABLE 2

|  |  | Example | | | | | | | | |
|---|---|---|---|---|---|---|---|---|---|---|
|  |  | 11 | 12 | 13 | 14 | 15 | 16 | 17 | 18 | 19 |
| Composition (part(s) by mass) | NR (TSR20) | 100 | 100 | 100 | 100 | 100 | 100 | 100 | 100 | 100 |
|  | Silica (VN3) | 10 | 10 | 10 | 10 | 10 | 10 | 10 | 10 | 10 |
|  | Carbon black (N326) | 40 | 40 | 40 | 40 | 40 | 40 | 40 | 40 | 40 |
|  | Cobalt boron neodecanoate | 0.44 | 0.44 | 0.44 | 0.44 | 0.44 | 0.44 | 0.44 | 0.44 | 0.44 |
|  | Silane coupling agent (Si69) | 1 | 1 | 1 | 1 | 1 | 1 | 1 | 1 | 1 |
|  | Hybrid crosslinking agent (HTS) | 0.5 | 0.5 | 0.5 | 0.5 | 0.5 | 0.5 | 0.5 | 0.5 | 0.5 |
|  | Antioxidant (TMQ) | 1 | 1 | 1 | 1 | 1 | 1 | 1 | 1 | 1 |
|  | Stearic acid | 0.5 | 0.5 | 0.5 | 0.7 | 0.7 | 0.7 | 1 | 1 | 1 |
|  | Zinc oxide | 10 | 10 | 10 | 10 | 10 | 10 | 10 | 10 | 10 |
|  | Sulfur | 6.56 | 6.25 | 7.5 | 6.56 | 6.25 | 7.5 | 6.56 | 6.25 | 7.5 |
|  | (pure sulfur content) | (5.25) | (5) | (6) | (5.25) | (5) | (6) | (5.25) | (5) | (6) |
|  | Vulcanization accelerator (TBSI) | 2.5 | 1.3 | 1 | 2.5 | 1.3 | 1 | 2.5 | 1.3 | 1 |
|  | Smikanol 620 | 1.5 | 1.5 | 1.5 | 1.5 | 1.5 | 1.5 | 1.5 | 1.5 | 1.5 |
|  | Smikanol 507A | 1.8 | 1.8 | 1.8 | 1.8 | 1.8 | 1.8 | 1.8 | 1.8 | 1.8 |
| Mass ratio of sulfur/vulcanization accelerator | | 2.1 | 3.85 | 6.0 | 2.1 | 3.85 | 6.0 | 2.1 | 3.85 | 6.0 |
| Evaluation result | E* (70° C.) | 7.4 | 5.7 | 5.9 | 7.6 | 6.1 | 6.4 | 7.8 | 6.5 | 6.6 |
|  | tan δ (70° C.) | 0.074 | 0.084 | 0.090 | 0.071 | 0.071 | 0.079 | 0.069 | 0.067 | 0.077 |
|  | Elongation at break (new one) | 330 | 485 | 520 | 325 | 465 | 520 | 315 | 450 | 510 |
|  | Elongation at break (hygrothermally aged one) | 220 | 355 | 400 | 210 | 355 | 335 | 210 | 335 | 315 |
|  | Cord adhesion (new one) | 4 | 5 | 5 | 4 | 5 | 5 | 4 | 4+ | 5 |
|  | Cord adhesion (hygrothermally aged one) | 3 | 4+ | 5 | 3 | 4 | 4 | 3 | 4 | 3+ |

TABLE 3

|  |  | Comparative Example | | | | | | | |
|---|---|---|---|---|---|---|---|---|---|
|  |  | 3 | 4 | 5 | 6 | 7 | 8 | 9 | 10 |
| Composition (part(s) by mass) | NR (TSR20) | 100 | 100 | 100 | 100 | 100 | 100 | 100 | 100 |
|  | Silica (VN3) | 10 | 10 | 10 | 10 | 10 | 10 | 10 | 10 |
|  | Carbon black (N326) | 40 | 40 | 40 | 40 | 40 | 40 | 40 | 40 |
|  | Cobalt boron neodecanoate | 0.44 | 0.44 | 0.44 | 0.44 | 0.44 | 0.44 | 0.44 | 0.44 |
|  | Silane coupling agent (Si69) | 1 | 1 | 1 | 1 | 1 | 1 | 1 | 1 |
|  | Hybrid crosslinking agent (HTS) | 0.5 | 0.5 | 0.5 | 0.5 | 0.5 | 0.5 | 0.5 | 0.5 |
|  | Antioxidant (TMQ) | 1 | 1 | 1 | 1 | 1 | 1 | 1 | 1 |
|  | Stearic acid | 0 | 0 | 0 | 0.7 | 0.7 | 1.5 | 1.5 | 1.5 |
|  | Zinc oxide | 10 | 10 | 10 | 10 | 10 | 10 | 10 | 10 |
|  | Sulfur | 6.25 | 6.25 | 7.5 | 6.25 | 7.5 | 6.25 | 6.25 | 7.5 |
|  | (pure sulfur content) | (5) | (5) | (6) | (5) | (6) | (5) | (5) | (6) |
|  | Vulcanization accelerator (TBSI) | 2.5 | 1.3 | 0.6 | 2.5 | 0.6 | 2.5 | 1.3 | 0.6 |
|  | Smikanol 620 | 1.5 | 1.5 | 1.5 | 1.5 | 1.5 | 1.5 | 1.5 | 1.5 |
|  | Smikanol 507A | 1.8 | 1.8 | 1.8 | 1.8 | 1.8 | 1.8 | 1.8 | 1.8 |
| Mass ratio of sulfur/vulcanization accelerator | | 2.0 | 3.85 | 10 | 2.0 | 10 | 2.0 | 3.85 | 10 |
| Evaluation result | E* (70° C.) | 5.2 | 4.1 | 4.4 | 7.3 | 6.2 | 8.0 | 6.9 | 6.4 |
|  | tan δ (70° C.) | 0.120 | 0.125 | 0.138 | 0.061 | 0.127 | 0.057 | 0.06 | 0.121 |
|  | Elongation at break (new one) | 500 | 555 | 535 | 320 | 450 | 235 | 405 | 485 |
|  | Elongation at break (hygrothermally aged one) | 315 | 410 | 370 | 195 | 310 | 150 | 265 | 185 |
|  | Cord adhesion (new one) | 2 | 3 | 3 | 4 | 5 | 3 | 4 | 4 |
|  | Cord adhesion (hygrothermally aged one) | 1 | 1 | 1 | 2+ | 4 | 2 | 2 | 2 |

TABLE 4

| | | Example | | | | | | | | |
|---|---|---|---|---|---|---|---|---|---|---|
| | | 20 | 21 | 22 | 23 | 24 | 25 | 26 | 27 | 28 |
| Composition (part(s) by mass) | NR (TSR20) | 100 | 100 | 100 | 100 | 100 | 100 | 100 | 100 | 100 |
| | Silica (VN3) | 10 | 10 | 10 | 10 | 10 | 10 | 10 | 10 | 10 |
| | Carbon black (N326) | 40 | 40 | 40 | 40 | 40 | 40 | 40 | 40 | 40 |
| | Cobalt boron neodecanoate | 0.44 | 0.44 | 0.44 | 0.44 | 0.44 | 0.44 | 0.44 | 0.44 | 0.44 |
| | Silane coupling agent (Si69) | 1 | 1 | 1 | 1 | 1 | 1 | 1 | 1 | 1 |
| | Hybrid crosslinking agent (HTS) | 0.5 | 0.5 | 0.5 | 0.5 | 0.5 | 0.5 | 0.5 | 0.5 | 0.5 |
| | Antioxidant (TMQ) | 1 | 1 | 1 | 1 | 1 | 1 | 1 | 1 | 1 |
| | Stearic acid | 0.5 | 0.5 | 0.5 | 0.7 | 0.7 | 1 | 1 | 1 | 1 |
| | Zinc oxide | 10 | 10 | 10 | 10 | 10 | 10 | 10 | 10 | 10 |
| | Sulfur | 5.63 | 7.5 | 7.5 | 5.63 | 7.5 | 5.63 | 7.5 | 5.63 | 6.25 |
| | (pure sulfur content) | (4.5) | (6) | (4.5) | (4.5) | (6) | (4.5) | (6) | (4.5) | (5) |
| | Vulcanization accelerator (TBSI) | 2.14 | 2.85 | 0.75 | 1.17 | 1.56 | 2.14 | 2.85 | 0.75 | — |
| | Vulcanization accelerator (ETZ) | — | — | — | — | — | — | — | — | 0.9 |
| | Smikanol 620 | 1.5 | 1.5 | 1.5 | 1.5 | 1.5 | 1.5 | 1.5 | 1.5 | 1.5 |
| | Smikanol 507A | 1.8 | 1.8 | 1.8 | 1.8 | 1.8 | 1.8 | 1.8 | 1.8 | 1.8 |
| Mass ratio of sulfur/vulcanization accelerator | | 2.1 | 2.1 | 6 | 3.85 | 3.85 | 2.1 | 2.1 | 6 | 5.56 |
| Evaluation result | E* (70° C.) | 7.13 | 7.85 | 4.85 | 7.25 | 7.96 | 7.37 | 8.25 | 4.99 | 6.0 |
| | tan δ (70° C.) | 0.057 | 0.051 | 0.105 | 0.055 | 0.048 | 0.054 | 0.047 | 0.102 | 0.076 |
| | Elongation at break (new one) | 390 | 340 | 540 | 380 | 335 | 375 | 305 | 550 | 455 |
| | Elongation at break (hygrothermally aged one) | 295 | 245 | 440 | 285 | 240 | 280 | 205 | 420 | 315 |
| | Cord adhesion (new one) | 4 | 3 | 5 | 4 | 3 | 4 | 3 | 5 | 4 |
| | Cord adhesion (hygrothermally aged one) | 3 | 3 | 4 | 3 | 3 | 3 | 3 | 4 | 3 |

In the examples in which sulfur and a certain vulcanization accelerator (TBSI, BEHZ, ETZ) mixed at a certain ratio, and a certain amount of stearic acid or cobalt stearate were used with silica and HTS, good fuel economy, good hardness, good elongation at break, and good adhesion were achieved in a balanced manner. Since no BR was used in these examples, the fail-safe concept was satisfied. In contrast, in the comparative examples in which the above ratio or the amount of stearic acid was out of the certain range, not all of the properties were sufficient, and it is thus clear that the compositions of the comparative examples cannot provide high-performance breakers.

The invention claimed is:

1. A breaker topping rubber composition, comprising:
a rubber component;
silica;
sulfur;
N-tert-butyl-2-benzothiazolylsulfenimide;
sodium 1,6-hexamethylene dithiosulfate dihydrate;
stearic acid;
0.5 to 4 parts by mass of modified resorcinol resins for each 100 parts by mass of the rubber component; and
cobalt boron neodecanoate,
wherein a mass ratio of [an amount of the sulfur]/[an amount of N-tert-butyl-2-benzothiazolylsulfenimide] is 2.1 to 6.0,
an amount of a natural rubber is 100% by mass, based on 100% by mass of the rubber component,
an amount of the stearic acid is 0.5 to 1 part by mass, an amount of the silica is 5 to 60 parts by mass, an amount of the sulfur is 4.5 to 6 parts by mass, an amount of sodium 1,6-hexamethylene dithiosulfate dihydrate is 0.2 to 5 parts by mass, an amount of N-tert-butyl-2-benzothiazolylsulfenimide is 0.75 to 2.86 parts by mass, and a cobalt content is 0.05 to 0.15 parts by mass, for each 100 parts by mass of the rubber component.

2. A pneumatic tire comprising a breaker comprising the rubber composition according to claim 1.

3. A breaker topping rubber composition, comprising:
a rubber component;
silica;
sulfur;
N-tert-butyl-2-benzothiazolylsulfenimide;
sodium 1,6-hexamethylene dithiosulfate dihydrate;
stearic acid;
0.5 to 4 parts by mass of modified resorcinol resins for each 100 parts by mass of the rubber component; and
cobalt boron neodecanoate,
wherein a mass ratio of [an amount of the sulfur]/[an amount of N-tert-butyl-2-benzothiazolylsulfenimide] is 2.1 to 6.0,
the rubber component consists essentially of a natural rubber and a modified styrene butadiene rubber,
an amount of the natural rubber is not less than 50% by mass, based on 100% by mass of the rubber component, and
an amount of the stearic acid is 0.5 to 1 part by mass, an amount of the silica is 5 to 60 parts by mass, an amount of the sulfur is 4.5 to 6 parts by mass, an amount of sodium 1,6-hexamethylene dithiosulfate dihydrate is 0.2 to 5 parts by mass, an amount of N-tert-butyl-2-benzothiazolylsulfenimide is 0.75 to 2.86 parts by mass, and a cobalt content is 0.05 to 0.15 parts by mass, for each 100 parts by mass of the rubber component.

4. The breaker topping rubber composition according to claim 3,
wherein an amount of the modified styrene butadiene rubber is not more than 50% by mass, based on 100% by mass of the rubber component.

5. A pneumatic tire comprising a breaker comprising the rubber composition according to claim 3.

6. A pneumatic tire comprising a breaker comprising the rubber composition according to claim 4.

* * * * *